US009066111B2

(12) United States Patent
Niemi et al.

(10) Patent No.: US 9,066,111 B2
(45) Date of Patent: Jun. 23, 2015

(54) IMAGE ENCODER AND METHOD FOR ENCODING IMAGES (75) Inventors: Sami Niemi, Skanör (SE); Johan Stén, Malmö (SE)

(73) Assignee: Mobile Imaging in Sweden AB, Lund (SE)

( * ) Notice: Subject to any disclaimer, the term of this patent is extended or adjusted under 35 U.S.C. 154(b) by 866 days.

(21) Appl. No.: 13/138,799

(22) PCT Filed: Apr. 15, 2010

(86) PCT No.: PCT/SE2010/050407
§ 371 (c)(1),
(2), (4) Date: Dec. 20, 2011

(87) PCT Pub. No.: WO2010/120239
PCT Pub. Date: Oct. 21, 2010

(65) Prior Publication Data
US 2012/0099655 A1    Apr. 26, 2012

(30) Foreign Application Priority Data
Apr. 17, 2009    (SE) ...................................... 0900522

(51) Int. Cl.
H04N 7/26    (2006.01)
H04N 19/93    (2014.01)
(52) U.S. Cl.
CPC ..................................... H04N 19/93 (2014.11)
(58) Field of Classification Search
None
See application file for complete search history.

(56) References Cited

U.S. PATENT DOCUMENTS

| 5,379,070 | A | 1/1995 | Retter et al. |
| 5,764,801 | A | 6/1998 | Munemasa et al. |
| 2002/0051140 | A1 | 5/2002 | Yamada |
| 2003/0053706 | A1* | 3/2003 | Hong et al. ................... 382/253 |
| 2003/0058143 | A1* | 3/2003 | Chiba et al. ..................... 341/67 |
| 2004/0141068 | A1 | 7/2004 | Adachi |
| 2009/0085781 | A1* | 4/2009 | Ohashi et al. ................... 341/67 |

FOREIGN PATENT DOCUMENTS

JP    2007267349 A    10/2007

OTHER PUBLICATIONS

International Search Report for International Application No. PCT/SE2010/050407 filed Apr. 15, 2010.
Office Action for Swedish Application No. 0900522-4, dated Mar. 20, 2015.

* cited by examiner

*Primary Examiner* — Sath V Perungavoor
*Assistant Examiner* — Kate Luo
(74) *Attorney, Agent, or Firm* — Alston & Bird LLP (57) ABSTRACT There is provided a method and a device for encoding a digital representation of an image into a single encoded image, comprising: generating at least two subsequent image data sequences each representing a portion of the digital representation of the image, inputting to an encoder (104) each of said subsequent image data sequences as if each image data sequence is an individual digital representations of an image, encoding each subsequent image data sequence into a variable length coded image, thereby generating at least two variable length coded images each representing a portion of the single encoded image, inserting a restart marker as terminating data of at least one of the variable length coded images, inserting an end of image marker as terminating data of one of the variable length coded images representing a final portion of the single encoded image, and associating the variable length coded images with each other by arranging them as subsequent parts of a single encoded data sequence representing the single encoded image.

23 Claims, 9 Drawing Sheets

IMAGE ENCODER AND METHOD FOR ENCODING IMAGES

TECHNICAL FIELD OF THE INVENTION

The present invention relates to a method and a device for encoding a digital image.

BACKGROUND OF THE INVENTION

An increasing number of devices that is enabled to capture images are designed and produced today. There are still image cameras such as SLRs and point and shoots, a variety of video cameras capturing moving images, mobile telephones equipped with cameras, etc. Moreover, nowadays the distinction between cameras capturing still images and cameras capturing moving images is fading as many still cameras also is designed to capture moving images and vice versa.

Devices arranged to capture images are designed to capture larger and larger images, in view of number of pixels. Larger images require more memory and larger buffers in order to handle the images. The larger images also require more processing power, sometimes requiring special hardware accelerators. This requirement of more memory and larger buffers becomes even more evident in devices enabled to manipulate the images. However, more memory and greater size buffers make the devices larger and more expensive.

SUMMARY OF THE INVENTION

It is an object of the invention to provide an improved method and device for encoding a digital representation of an image.

The object is achieved by means of a method for encoding a digital representation of an image into a single encoded image according to claim 1 and by means of a device for encoding a digital representation of an image into a single encoded image according to claim 16. Further embodiments of the invention are disclosed in the dependent claims.

In particular, according to a first aspect of the invention, the object is achieved by means of a method for encoding a digital representation of an image into a single encoded image, comprising: generating at least two subsequent image data sequences each representing a portion of the digital representation of the image, inputting to an encoder (104) each of said subsequent image data sequences as if each image data sequence is an individual digital representations of an image, encoding each subsequent image data sequence into a variable length coded image, thereby generating at least two variable length coded images each representing a portion of the single encoded image, inserting a restart marker as terminating data of at least one of the variable length coded images, inserting an end of image marker as terminating data of one of the variable length coded images representing a final portion of the single encoded image, and associating the variable length coded images with each other by arranging them as subsequent parts of a single encoded data sequence representing the single encoded image.

Further, according to a second aspect of the invention, the object is achieved by means of a device for encoding a digital representation of an image into a single encoded image, comprising: an image generator arranged to generate subsequent image data sequences representing portions of the digital representation of the image, an encoder arranged to encode each image data sequence representing portions of the digital representation of the image into a variable length coded image, a restart marker inserter arranged to insert a restart marker as terminating data of a variable length coded image, an end of image marker inserter arranged to insert an end of image marker as terminating data of a variable length coded image representing a final portion of the single encoded image, and an associating unit arranged to associate the variable length coded images with each other by arranging them as subsequent parts of a data sequence representing the single encoded image.

An advantage of processing portions of an image as described above or arranging a device to process portions of the image is that the processing may be performed using less advanced equipment or circuitry. Moreover, the amount of memory required for processing, e.g. buffers and other temporary memories, may be decreased. Further, the processing capacity of the processor or the circuitry may also be reduced. Additionally, the feature of arranging the portions of the image as individual digital representations of an image a simple encoder arranged to encode entire images may be utilized.

According to one embodiment of the invention the step of encoding each subsequent image data sequence representing a portion of the digital representation of the image into a variable length coded image further comprises inserting an end of image marker as terminating data in each of the encoded image data sequences, wherein the step of inserting a restart marker as terminating data of the encoded image data sequences is performed by replacing the end of image marker with the restart marker. The advantage of this is that it is a simple way of adjusting an output from an encoder into a suitable format and that it may not require a lot of capacity from the system.

According to another embodiment the method comprises the step of generating or an image header generator arranged to generate a single file header representing the associated variable length coded images forming the single encoded image.

In yet another embodiment the act of generating a single file header includes: determining a position of at least one restart marker in the single encoded image, and inserting an indicator indicating the determined position of said at least one restart marker into a data structure of the file header. Accordingly, the single file header comprises at least one parameter indicating the position of restart markers in the single encoded image.

In a further embodiment the step of inserting a restart marker as terminating data of at least one of the variable length coded image is performed by inserting the restart marker as last data of the encoded variable length coded image.

Alternatively, the step of inserting a restart marker as terminating data of at least one variable length coded image is performed by inserting the restart marker of the encoded variable length coded image as initial data of a subsequent variable length coded image.

In another embodiment the device comprises a writer arranged to write the variable length coded images to a memory and the method comprises the step of simultaneously writing data of a first variable length coded image to a memory and encoding an image data sequence representing a second portion of the digital representation of the image into a second variable length coded image. One embodiment comprises simultaneously generating the image data sequence representing a second portion of the digital representation of the image and encoding the image data sequence representing a first portion of the digital representation of the image into a first variable length coded image.

According to another embodiment the digital representation of the image has a specific image width $W_i$, and wherein each portion of the image has a specific portion width $W_p$ corresponding substantially to the image width $W_i$.

According to yet another embodiment each variable length coded image has a specific width $W_{vic}$, wherein the specific width $W_{vic}$ corresponds to a width $W_{ei}$ of the single encoded image.

According to yet another embodiment each variable length coded image is an image of JPEG-format.

According to yet another embodiment the act of inserting a restart marker comprises inserting a 0xFFDn code sequence wherein n indicates the 4 least significant bits of the code sequence and represents an integer between 0 and 7. The restart marker is inserted by means of restart marker inserter.

According to yet another embodiment the act of inserting an end of image marker comprises inserting a 0xFFD9 code sequence.

According to yet another embodiment the method is performed in a mobile telephone alternatively in a digital camera.

BRIEF DESCRIPTION OF THE DRAWINGS

The invention will be described in more detail by way of examples with reference to the appended schematic drawings, which shows embodiments of the invention.

DETAILED DESCRIPTION OF PREFERRED EMBODIMENTS

In the following description, encoding of images will be described with reference to JPEG-encoding, although other encodings using other transforms, e.g. JPEG XR or HD Photo, may be contemplated. It should be noted that the scope of protection of the present invention is in no way limited to JPEG-encoding.

When encoding an image using JPEG encoding a digital image is preferably a digital image represented in the YUV format, wherein each pixel of the image has three components: luminance, Y, and two chromatic components U and V. The two chromatic components U and V represent color features. The human eye have difficulties perceiving the finest details in the chromatic components and, thus, these components may be represented in a lower resolution than the luminance component. A 16×16 pixel block of the image, which is an example of an image block as defined herein, may be represented by four Y-blocks of 8×8 pixels each, one U-block of 8×8 pixels, and one V-block of 8×8 pixels. This corresponds to a 50% compression of the data set compared to a RGB-representation of the digital image. However, four U-blocks and four V-blocks may also be used, wherein no compression is obtained compared to the RGB-representation.

Alternatively, the digital image may be represented by another type of format, for example in RGB or CMYK format. In this case the digital image is preferably converted into YUV format before being processed by the inventive device.

Many compressed image formats are variable length coded, and often parts of the images are dependent on other parts of the image, making them difficult to manage and difficult to manipulate. The issues may involve bit alignment problems, as the image is a bit stream, and the computer memory stores in blocks of bytes rather than bits. The dependencies may for example make it difficult to alter or join images without modifying more than the altered area of the image, or modifying one or the other of the joined images, or both.

The dependencies of the parts of the image make it impossible to recover from transmission errors in the image, as an error early on in an image will propagate throughout the remaining image. In JPEG images each 8×8 block's average value (DC) is calculated based on a difference to the previous 8×8 block, thus an erroneous DC-difference will render rest of the JPEG image corrupt.

In JPEG standard there is a mechanism of restart markers allowing the encoder to specify a restart interval where the dependency of the previous DC value is reset, thus allowing rest of the image to be decoded correctly once the next restart marker is found.

In order to find the next restart marker there is reserved a 0xff byte for communicating "markers" in the JPEG standard; meaning that each 0xff in the JPEG stream that is not followed by 0x00 is a marker of some kind. Thus finding the next restart marker just involves finding the next 0xff, not being 0xff00, and starting decoding from that point.

The restart markers is also arranged to realign the bit stream before the 0xff marker by inserting bits until the last byte is fully aligned. This is required since the search for 0xff is conducted in bytes, rather than bits, allowing one embodiment of this invention to explore that property.

Another useful property utilized in one embodiment of the invention is that the end of image marker for the JPEG standard behaves in exactly the same way as the restart markers, even with alignment of the last byte before the alignment.

Figure 1:
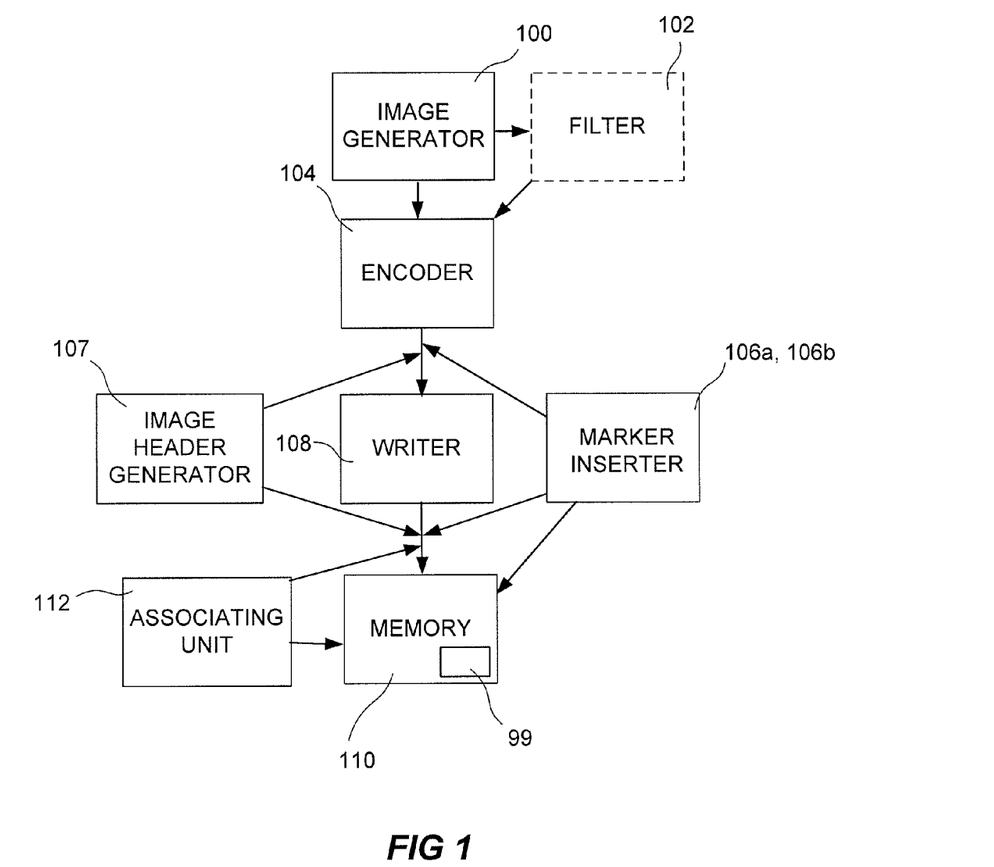
FIG. 1 is a schematic illustration of a first embodiment of a device for encoding a digital image.

A first embodiment of a device for encoding a digital representation of an image into an encoded image according to the invention is shown in FIG. 1. The device comprises an image generator 100, an encoder 104, a marker inserter 106a, 106b, an image header generator 107, a writer 108, an associating unit 112 and a memory 110. The device may also, as shown in this embodiment, comprise a filter 102. The filter 102 is optional, see below.

The image generator 100 is arranged to generate the digital representation of an image. The digital representation of the image may be generated in various ways. For example may the digital representation of the image be generated by a digital camera e.g. in a mobile phone. Alternatively, may the digital representation of the image be a generated mathematical representation of a 2D or 3D object. The digital representation of the image may even be a blending of an image generated by a digital camera and a generated mathematical representation of a 2D or 3D object. According to one embodiment of the present invention, the digital representation of the image may comprise data from several images generated by a digital camera or generated mathematical representations of a 2D or 3D objects. An example of such a digital representation of an image is a panorama comprising several images. Such a panorama image consists of multiple images that are properly manipulated to fit together, and blended together into one representation.

The source, e.g. the digital camera, a computer or a mobile phone, generating the digital representation of the image is adopted to render an image comprising pixels. The digital representation of the image has a specific width $W_i$ and height $H_i$. For example may the digital image comprise of 960×1280 ($W_i$×$H_i$) pixels. Thus, each line of pixels of the digital representation of the image comprises 960 pixels and the digital representation of the image comprises 1280 such lines of pixels.

Figure 2:
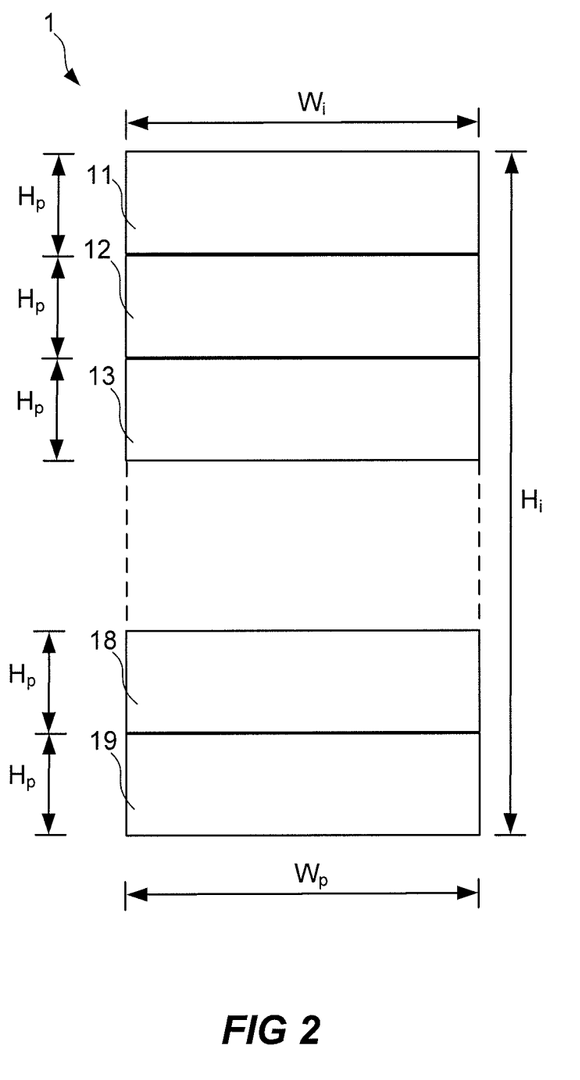
FIG. 2 is illustrating an image being encoded by the device shown in FIG. 1.

Further, the image generator 100 is arranged to generate the digital representation of the image portion by portion, wherein each portion is a portion 11, 12, 13, 18, 19 of the digital representation of the image and wherein each portion 11, 12, 13, 18, 19 being represented by an image data sequence. Thus, the output from the image generator 100 is subsequent image data sequences representing portions 11, 12, 13, 18, 19 of the digital representation of the image. An example of a digital representation of the image 1 generated by the image generator 100 is shown in FIG. 2. As shown may the portions 11, 12, 13, 18, 19 outputted from the image generator 100 have a width $W_p$ corresponding substantially to the width $W_i$ of the image 1. Further, the image generator 100 may be arranged to output portions 11, 12, 13, 18, 19 of the digital representation of the image 1 all having substantially the same height $H_p$. Thus, every portion 11, 12, 13, 18, 19 of the digital representation of the image 1 are all having substantially the same amount of lines of pixels. An exception is the last portion 19 of the digital representation of the image 1 that may comprise fewer lines of pixels than the rest of the portions 11, 12, 13, 18 depending on the number of lines of the digital representation of the image 1. For example, if the number of lines in the image are 1200 the image may be generated in nine portions of the image 1 each having 128 lines of pixels and a tenth and last portion 19 of the image 1 having only 48 lines of pixels. According to another example, the digital representation of the image 1 mentioned above comprising 960×1280 ($W_i$×$H_i$) pixels may be generated in portions 11, 12, 13, 18, 19 having a width $W_p$ of 960 pixels and a height $H_p$ of 128 pixels. Thus, the digital representation of the image is in this case being generated in ten portions 11, 12, 13, 18, 19 all having the same amount of lines of pixels.

The encoder 104 is arranged to receive each of said data sequences representing portions 11, 12, 13, 18, 19 of the digital representation of the image 1 generated by the image generator 100 as if individual images. Thus, each of said data sequences representing portions 11, 12, 13, 18, 19 of the digital representation of the image 1 is inputted to the encoder 104 as if being an individual image.

Further, the encoder 104 is arranged to encode each image data sequence representing a portion 11, 12, 13, 18, 19 of the digital representation of the image 1 into a variable length coded image (VLC-image), wherein each VLC-image represent a portion of the resulting single encoded image 99. The encoder 104 may be a hardware encoder.

Thus, the encoder 104 is arranged to encode each of the from the image generator 100 outputted image data sequences representing portions 11, 12, 13, 18, 19 of the digital representation of the image 1 into a self-contained VLC-image. Self-contained in this case is referring to a VLC-image that is containing all information needed to use the VLC-image as an individual image.

An example of a self contained image is a complete JPEG image with a header and a footer. Another such self contained image would be a combination on information or knowledge required for decoding the data of the image, such as knowledge about the Quantization, and Huffman tables for the image data and the JPEG data representing the pixels. According to an embodiment of the present invention the VLC-image representing a portion 21, 22, 23, 28, 29 of the resulting image 99 is an image of JPEG format and the encoder 104 is a JPEG-encoder.

The marker inserter 106a, 106b is arranged to insert a separation marker as termination data of each VLC-image encoded by the encoder 104. The marker inserter 106a, 106b may be an integrated part of the encoder 104. If this is the case, the encoder 104 may include hardware which is arranged to insert the separation marker or the encoder 104 include software arranged to insert the separation marker. The software may e.g. be the driver of the encoder 104. Alternatively, as in the in FIG. 1 shown embodiment, the marker inserter 106a, 106b may be a separate unit. It is also understood that even if the encoder 104 does comprise an integrated marker inserter the inventive device may also comprise a separate marker inserter 106a, 106b. The separate marker inserter 106a, 106b may be arranged to control the marker inserter of the encoder 104.

If the VLC-image 21, 22, 23, 28, 29 is representing the last portion 19 of the digital representation of the image 1, thus being the last encoded image data sequence, the marker inserter 106a, 106b is acting as an end of image marker inserter 106b inserting an end of image marker (EOI-marker) 40. Alternatively, if the VLC-image 21, 22, 23, 28 is not representing the last portion 19 of the digital representation of the image 1, thus not being the last encoded image data sequence, the marker inserter 106a, 106b is acting as a restart marker inserter 106a inserting a restart marker 42.

According to an embodiment of the present invention the restart marker 42 is inserted as last data of the encoded variable length coded image 21, 22, 23, 28, 29. However, alternatively, the restart marker 42 may as well be inserted as initial data of the subsequent variable length coded image 21, 22, 23, 28, 29. Regardless of if the restart marker 42 is inserted as last data of the encoded variable length coded image 21, 22, 23, 28, 29 or if the restart marker 42 is inserted as initial data of the subsequent variable length coded image 21, 22, 23, 28, 29 the result is the same; the restart marker 42 is terminating data of each variable length coded image 21, 22, 23, 28, 29.

If the VLC-image 21, 22, 23, 28, 29 is an image of JPEG format the marker inserter 106a, 106b when acting as a restart marker inserter 106a is arranged to insert the restart marker 42 being represented by a 0xFFDn code sequence, where n is the 4 least significant bits of the code sequence and cycles from 0 to 7. Thus, a restart marker 42 represented by a 0xFFD0 code sequence is inserted as the terminating data of the first VLC-image 21 representing the first portion 11 of the digital representation of the image 1. Further, a restart marker 42 represented by a 0xFFD1 code sequence is inserted as the terminating data of the second VLC-image 22 representing the first portion 12 of the digital representation of the image 1. And the process continues like this. When the restart marker 42 represented by a 0xFFD7 code sequence have been used the next restart marker 42 will be represented by the 0xFFD0 code sequence and after that the 4 least significant bits of the code sequence will increase again for the next restart marker 42 in the cycle.

If the VLC-image 21, 22, 23, 28, 29 is an image of JPEG format the marker inserter 106a, 106b, when acting as an end of image marker inserter 106b, is arranged to insert the EOI-marker 40 as being represented by a 0xFFD9 code sequence.

According to an embodiment of the present invention the restart marker 42 is directly inserted by the restart marker inserter 106a during the encoding by the encoder 104. Alternatively, according to an embodiment of the present invention the encoder 104 is arranged to terminate each VLC-image 21, 22, 23, 28, 29 with an end of image marker 40 as terminating data. Thus, each VLC-image 21, 22, 23, 28, 29 may comprise an end of image marker 40 as terminating data when outputted from the encoder 104. If so the restart marker inserter 106a, 106b is arranged to insert the restart marker 42 by replacing an already inserted EOI-marker 40 with a restart marker 42. Thus, for this alternative embodiment an EOI-marker 40 is first inserted and the EOI-marker 40 is thereafter replaced with a restart marker 42 by the restart marker inserter 106a. The marker inserter 106a, 106b may be arranged to insert the separation marker, i.e. the restart marker 42 or the EOI-marker 40, to the VLC-image 21, 22, 23, 28, 29 directly after the encoding is performed by the encoder 104.

The writer 108 is arranged to write the VLC-images 21, 22, 23, 28, 29 to the memory 110. The memory 110 may be any kind of memory suitable for storing an encoded digital image. For example may the memory 110 be a hard disk, a flash memory, a memory card, a memory stick, a DRAM, a SDRAM, a networked device, such as Bluetooth, or wireless driver etc.

The writer 108 may be arranged to write the VLC-image 21, 22, 23, 28, 29 to the memory 110 with or without the separation marker as terminating data. Thus, the marker inserter 106a, 106b may be arranged to insert the separation marker, i.e. the restart marker 42 or the EOI-marker 40 either before each VLC-image 21, 22, 23, 28, 29 has been written to the memory 110 of after each VLC-image 21, 22, 23, 28, 29 has been written to the memory 110.

The associating unit 112 is arranged to associate VLC-images 21, 22, 23, 28, 29 with each other by arranging them as subsequent parts of a single encoded data sequence representing the single encoded image 99.

The associating unit 112 is arranged to associate the encoded VLC-images 21, 22, 23, 28, 29 with each other using a single file header 20 representing the associated variable length coded image 21, 22, 23, 28, 29 forming the single encoded image 99. The single file header 20 has a field for the separation marker interval, i.e. a number indicating how often a separation marker appears. The single file header 20 may additionally have a field for the number VLC-images 21, 22, 23, 28, 29, i.e. a number indicating how many separate encoded image portions 21, 22, 23, 28, 29 that are associated with each other in order to form the single encoded data sequence representing the single encoded image 99. The single file header 20 may also comprise a start of image marker, indicating the start of the image.

The single file header 20 may be generated by the image header generator 107. The image header generator 107 may be an integrated part of the encoder 104. If so the encoder 104 may be arranged to generate an image header by its hardware or the encoder 104 may be arranged to generate the image header by means of software. The software may e.g. be the driver of the encoder 104. Alternatively, as in the in FIG. 1 shown embodiment, the image header generator 107 may be a separate unit. It is also understood that even if the encoder 104 does comprise an image header generator the inventive device may also comprise a separate image header generator 107. The separate image header generator 107 may be arranged to control the image header generator of the encoder 104.

According to an embodiment of the present invention the single file header 20 is generated by the image header generator 107. Alternatively, according to an embodiment of the present invention the encoder 104 is arranged to generate an image header when encoding the portion of the digital representation of the image 1 into a VLC-image 21, 22, 23, 28, 29. Thus, each VLC-image may also comprise an image file header when outputted from the encoder 104. If so the single file header 20 may be generated by modifying an already existing image file header. Thus, for this alternative embodiment an already existing image file header of one of the VLC-images is modified and used as the single file header 20.

The single file header 20 may be generated and/or modified during the process of encoding each image data sequence representing a portion 11, 12, 13, 18, 19 of the digital representation of the image 1 into a VLC-image 21, 22, 23, 28, 29. Alternatively, may the single file header 20 be generated as a post processing act, wherein the single file header 20 is generated just prior to final storage of the encoded image 99.

According to an embodiment of the present invention the associating unit 112 is arranged to associate the VLC-images 21, 22, 23, 28, 29 with each other after being written to the memory 110.

According to an alternative embodiment of the present invention each VLC-image 21, 22, 23, 28, 29 is written to the memory having an EOI-marker 40 as terminating data. The associating unit 112 is then arranged to replace the EOI-markers 40 of all the VLC-images 21, 22, 23, 28 except the last VLC-image 29 with a restart marker 42 and associating the VLC-images 21, 22, 23, 28, 29 with each other.

Figure 3:
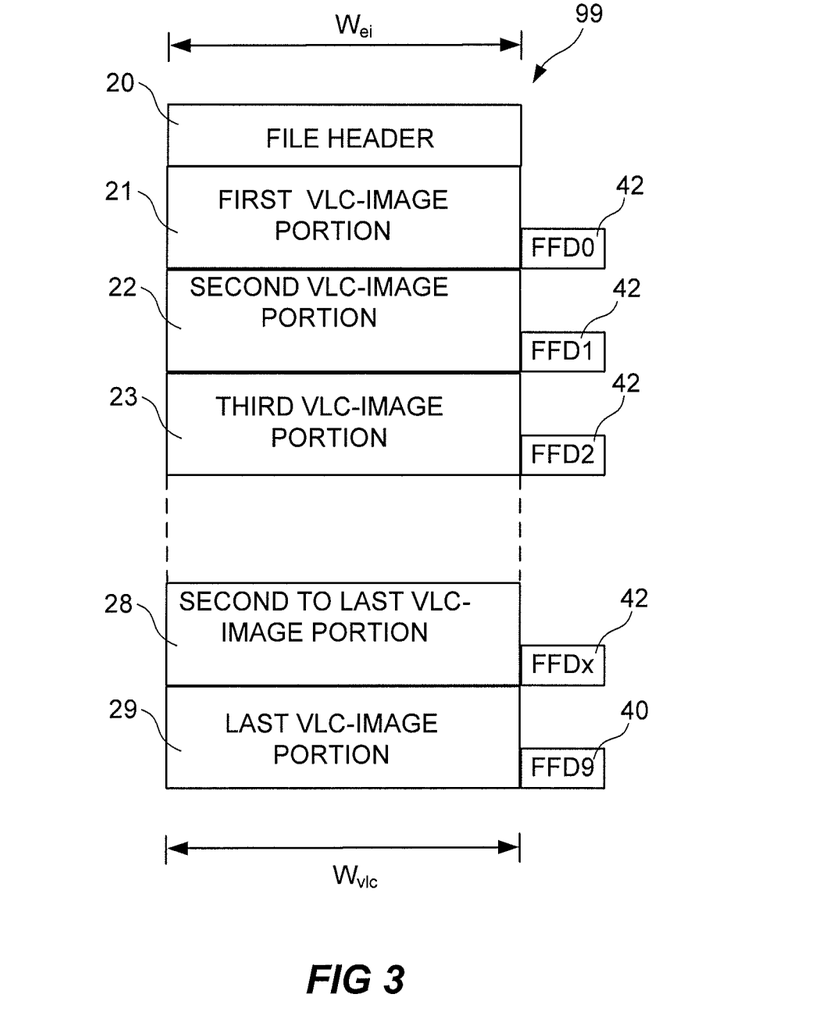
FIG. 3 is a schematic illustration of an encoded image.

An example of an encoded image 99 encoded with the device according to the first embodiment of the invention is shown in FIG. 3. The encoded image 99 comprises a number of VLC-images portions 21, 22, 23, 28, 29. Instead of being terminated by an EOI marker 40 all the VLC-images except the last VLC-image is terminated by a restart marker 42. The VLC-images are associated with each other in order to form the single encoded image 99. Thus, the single encoded image 99 comprises a number of image data sequences 21, 22, 23, 28, 29 each terminated by a restart marker 42 and a last image data sequence 29 terminated by an EOI marker 40.

According to an embodiment of the present invention each VLC-image 21, 22, 23, 28, 29 is having a specific width $W_{vic}$ corresponding substantially to a width $W_{ei}$ of the single encoded image 99. By encoding the VLC-images with the same width as the width $W_{ei}$ of the single encoded image 99 the processing of each VLC-image as a single image is facilitated. Further, each VLC-image may have substantially the same height $H_{vic}$. Thus, every VLC-image are all having substantially the same amount of lines of pixels. An exception is the last VLC-image that may comprise fewer lines of pixels than the rest of the VLC-images.

In another embodiment the encoder may be arranged to code blocks of image data, wherein the width of each block is less than the width of the entire line for the single encoded image 99. The width of each such block may be identical and the width of the single encoded image 99, i.e. the resulting encoded image, has a width that is an multiple of the width of each of the blocks of image data. In this embodiment each line of a block may be terminated by a restart marker and, thus, each line of the single encoded image if assembled from these encoded blocks of data includes a plurality of restart markers. The data between two consecutive restart markers represent identical number of pixels. The restart markers for each line may have been inserted by the encoder, and each of the blocks may end with an EOI marker. In order to arrange the blocks of images into a partition that is to be arranged into a single image, the EOI image marker needs to be replaced with a restart marker when associated into the single image.

According to an embodiment of the present invention the encoded image 99 is an image of JPEG-format.

For the sake of understanding the alignment and insertion of the restart markers 42 and the EOI marker 40 according to the JPEG standard, an example is shown below:

Suppose that the restart marker 42/EOI marker 40 is inserted after the following bit sequence, depicting the last bits of an MCU, with the "|" character indicating byte boundary:

11010011|01010011|10100

As the bits are not aligned with bytes, the last bits must be padded by ones until a bit boundary is reached, then the marker, in this case FFD1 is inserted:

... 11010011|01010011|10100111|11111111|11010001

Notice, that the encoder when encoding an image will insert an EOI marker 40 as the last bytes, while padding the previous bits with ones in order to reach alignment. By replacing the EOI marker 40 in each encoded image with a proper restart marker 42, the images can be concatenated into one large image, and the header is modified to support a correct restart interval.

The filter 102, which as discussed above is optional, may be arranged to filter or mask image data. For example may the filter be arranged to convert a color image into a grayscale image. Alternatively a set of filters creating complex representations such as panoramic images, or operations on the output image based on multiple source images, such as high dynamic range photography may be used. The filter 102 may be an integrated part of the image generator 100. Alternatively, as in the in FIG. 1 shown embodiment, the filter 102 may be a separate unit. It is also understood that even if the image generator 100 does comprise a filter the inventive device may also comprise a separate filter 102. The separate filter 102 may be arranged to control the filter of the image generator 100.

Figure 4:
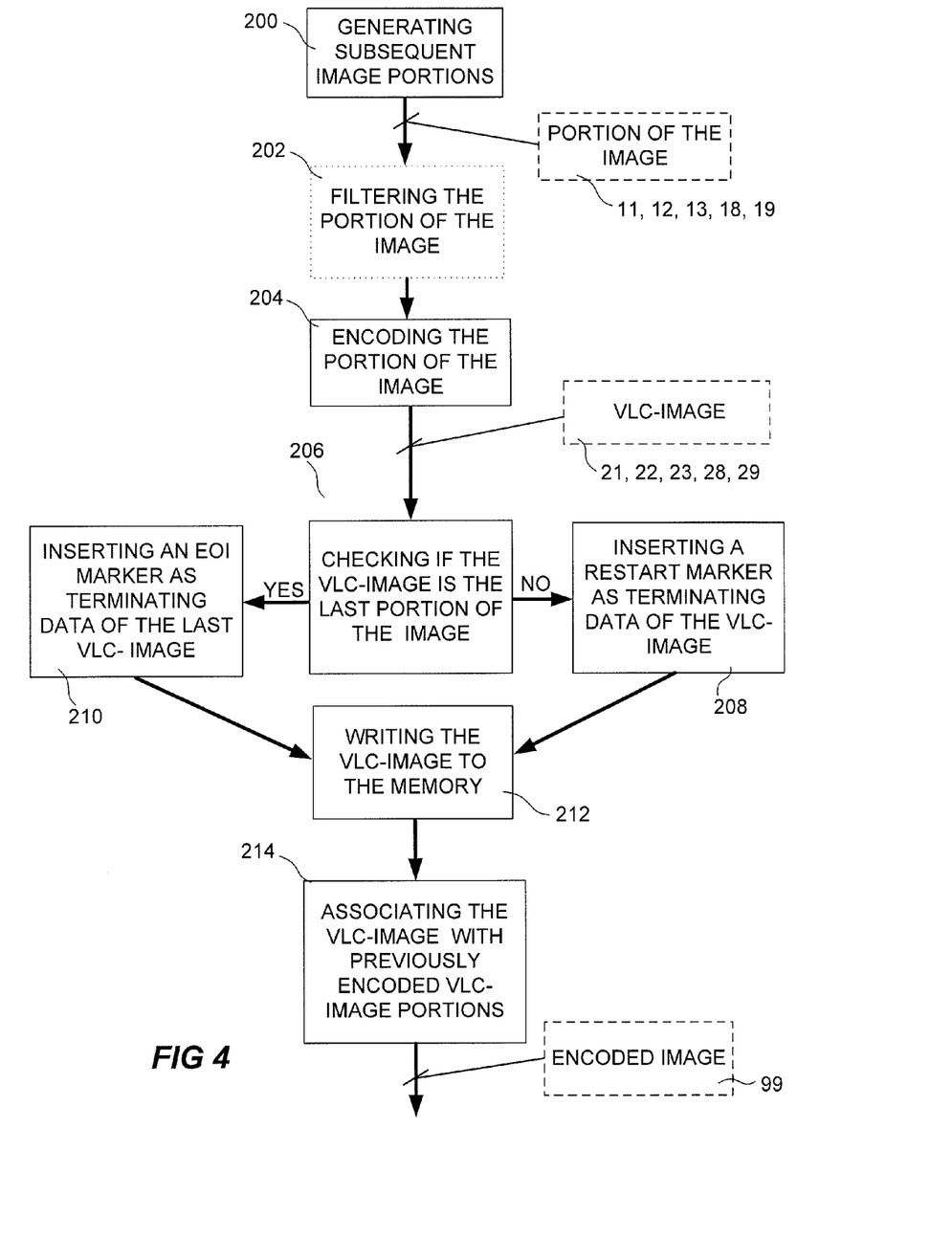
FIG. 4 is a flowchart of a method according to the first embodiment of the invention.

Let us assume that a digital representation of an image 1 is to be encoded into an encoded image 99 by a device according to the first embodiment of the invention. According to one embodiment of the invention, a method for encoding the original image 1 is then performed according to the process described below, see FIG. 4.

The digital representation of the image 1 is generated, by the image generator 100, into subsequent image data sequences representing portions 11, 12, 13, 18, 19 of the image 1, step 200. In one embodiment the widths $W_p$ of the portions 11, 12, 13, 18, 19 of the digital representation of the image 1 are corresponding substantially to the width $W_i$ of the digital representation of the image 1. Moreover, according to one embodiment all portions 11, 12, 13, 18, 19 of the image 1 are having the same height. Thus, every portion 11, 12, 13, 18, 19 of the digital representation of the image 1 are all having the same amount of lines of pixels. For example may a digital representation of an image originally consisting of 960×1280 ($W_i$×$H_i$) pixels be generated as ten portions 11, 12, 13, 18, 19 having a width $W_p$ of 960 pixels and a height $H_p$ of 128 pixels.

Each image data sequence representing a portion 11, 12, 13, 18, 19 of the digital representation of the image 1 is encoded by the encoder 104, step 204. In the encoder 104 each image data sequence representing a portion 11, 12, 13, 18, 19 of the image 1 is encoded into a VLC-image 21, 22, 23, 28, 29 representing a portion of the resulting image 99. According to an embodiment each VLC-image 21, 22, 23, 28, 29 is an image of JPEG-format.

After encoding each image data sequence representing a portion 11, 12, 13, 18, 19 of the digital representation of the image 1 into the VLC-image 21, 22, 23, 28, 29, an act of checking if the VLC-image 21, 22, 23, 28, 29 is representing the last portion 19 of the image 1 is performed, step 206. The step of checking if the VLC-image 21, 22, 23, 28, 29 is representing the last portion 19 of the digital representation of the image 1 may for example be performed by counting the number of encoded VLC-images 21, 22, 23, 28, 29. When generating the digital representation of the image 1 as image data sequences representing portions 11, 12, 13, 18, 19 of the image 1, step 200, the number of VLC-images 21, 22, 23, 28, 29 to be encoded is decided. In the example given above the digital representation of the image 1 is generated as ten portions 11, 12, 13, 18, 19. Thus, the first nine encoded VLC-images 21, 22, 23, 28, 29 shall be terminated by a restart marker 42 and the tenth VLC-image 29 shall be terminated by an EOI-marker 40. Information relating to the number of portions 11, 12, 13, 18, 19 may be stored in the file header 20. Also information relating to the position(s) or intervals of the restart marker(s) may be stored in the file header 20.

As long as the result from the check in step 206 is that the recently encoded VLC-image 21, 22, 23, 28, 29 is not representing the last portion 19 of the digital representation of the image 1 a restart marker 42 is inserted as terminating data of the VLC-image 21, 22, 23, 28, step 208. The insertion of the restart marker 42 is performed by the restart marker inserter 106a. In case of the VLC-image 21, 22, 23, 28 being an image of JPEG format the restart marker 42 is represented by a 0xFFDn code sequence, where n is the 4 least significant bits of the code sequence, cycles from 0 to 7. Thus, a restart marker 42 represented by a 0xFFD0 code sequence is inserted as the terminating data of the first VLC-image portion 21 representing the first portion 11 of the digital representation of the image 1. Further, a restart marker 42 represented by a 0xFFD1 code sequence is inserted as the terminating data of the second VLC-image portion 22 representing the second portion 12 of the digital representation of the image 1. And the cycle continues like this. When the restart marker 42 represented by a 0xFFD7 code sequence have been used the next restart marker 42 will be represented by the 0xFFD0 code sequence and after that the low 4 bits of the code sequence will increase again for the next restart marker 42 in the cycle.

If instead the VLC-image 21, 22, 23, 28, 29 is representing the last portion 19 of the digital representation of the image 1, thus being the last VLC-image 29, an EOI-marker 40 is inserted as terminating data of the last VLC-image 29, step 210. The insertion of the EOI-marker 40 is performed by the end of image marker inserter 106b.

Further, each VLC-image 21, 22, 23, 28, 29 is written to the memory 110, step 212. The act of writing each VLC-image 21, 22, 23, 28, 29 is performed by the writer 108.

According to an embodiment of the present invention each VLC-image 21, 22, 23, 28, 29 may be written to the memory 110 after insertion of the separation marker (restart marker 42 or EOI-marker 40) as the terminating data of each VLC-image 21, 22, 23, 28, 29. Alternatively the separation marker, i.e. restart marker 40 or EOI-marker 42, may be inserted after the data of the encoded VLC-image 21, 22, 23, 28, 29 is written to the memory.

Each VLC-image 21, 22, 23, 28, 29 is also associated with previously encoded VLC-image 21, 22, 23, 28, 29, step 212. This step 212 is obviously not performed after encoding the first VLC-image 21. In this manner VLC-image 21, 22, 23, 28, 29 are associated to each other in order to form the encoded image 99.

The amount of memory needed in the process of producing the encoded image 99 to encode the portions and write the encoded image 99 is reduced as the system and the method allows for generation and processing of portions of the image 1 in contrast to generate and process the entire image 1 at once.

As an optional step the image data sequence representing each portion 11, 12, 13, 18, 19 of the image 1 may be filtered or masked, step 202. For example an image data sequence representing a color image may be filtered into a grayscale image. Alternatively a set of filters creating complex representations such as panoramic images, or operations on the image based on multiple source images, such as high dynamic range photography may be used.

According to a second embodiment of the present invention the encoder 104 is arrange to pause its encoding process during encoding a digital representation of an image. In such a case insertion of the separation marker, e.g. restart marker 40, may be avoided, and the association between the encoded image portions can be performed immediately by appending a recently encoded VLC-image to a previously encoded VLC-image.

Figure 5:
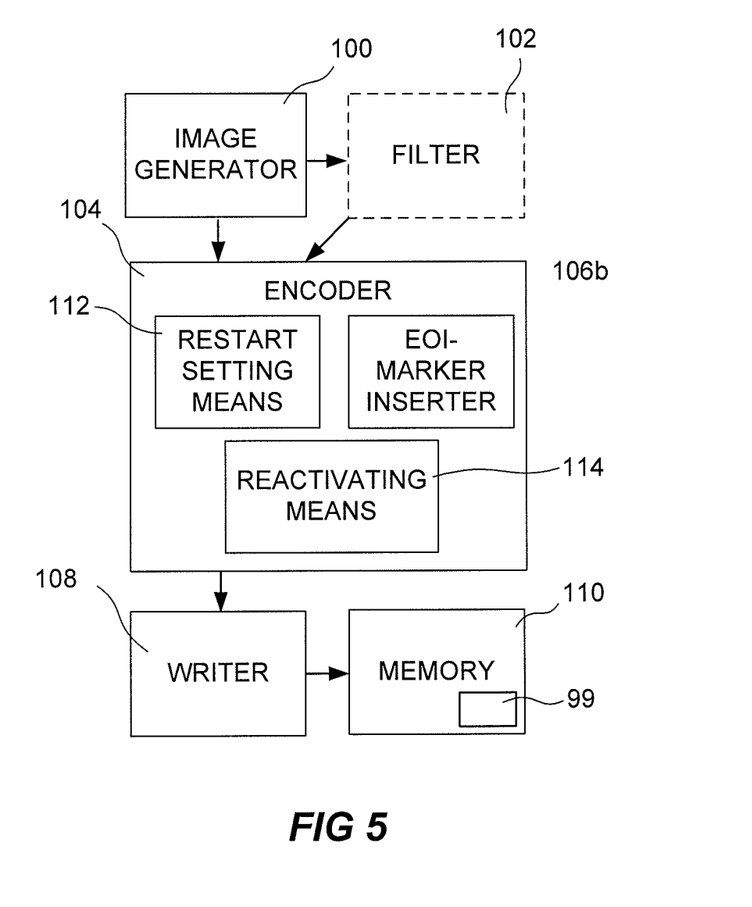
FIG. 5 is a schematic illustration of a first embodiment of a device for encoding a digital image.

In FIG. 5 a device for encoding a digital image into a single encoded image 99 according to this second embodiment of the present invention is shown. The device comprises an image generator 100, an encoder 104, a writer 108, and a memory 110. The device may also, as shown in this embodiment, comprise a filter 102. The filter 102 is optional, see above.

The image generator 100 is arranged to generate the digital representation of the image. The image generator 100 is arranged in the same way as the image generator of the device according to the first embodiment of the present invention. Thus, for a detailed explanation of the function of the image generator 100 please see above.

The encoder 104 is arranged to encode an image data sequence into a variable length coded image (VLC-image) 21, 22, 23, 28, 29. In particular the encoder 104 is arranged to encode each of the from the image generator 100 outputted image data sequences representing portions 11, 12, 13, 18, 19 of the representation of the image 1 into a VLC-image 21, 22, 23, 28, 29. According to an embodiment the VLC-image 21, 22, 23, 28, 29 is an image of JPEG format. If so, the encoder is a JPEG-encoder.

The encoder 104 comprises a restart setting means 112 arranged to set the encoder 104 in a restart state, a reactivation means 106 arranged to reactivate the encoder 104 being set in a restart state and an end of image marker inserter 106b arranged to insert an end of image marker 40.

The restart setting means 112 is arranged to set the encoder in a restart state in response to termination of the encoding of each variable length coded image 21, 22, 23, 28, 29. The encoder 104 is e.g. set in the restart state when waiting for a new image data sequence representing a portion 11, 12, 13, 18, 19 of the image 1 to be generated by the image generator 100. This is e.g. useful when the step of generating an image data sequence representing a portion 11, 12, 13, 18, 19 of the digital image 1 is slower than the step of encoding an image data sequence representing a portion 11, 12, 13, 18, 19 of the digital image 1 into a variable length coded image 21, 22, 23, 28, 29.

The reduction of memory used results from the fact that the whole image needs not to be generated prior to encoding and, thus, only a portion of the image has to reside in the memory where otherwise the entire image has to reside in memory.

The reactivation means 106 is arranged to reactivate the encoder 104 from the restart state initiated by the termination of a previously performed encoding of an image data sequence representing a previously encoded portion 11, 12, 13, 18, 19 of the digital representation of the image 1.

When the reactivation means 106 has reactivated the encoder 104 the encoder 104 is arranged to encode the recently generated image data sequence representing a subsequent portion 11, 12, 13, 18, 19 of the digital representation of the image 1 into a subsequent variable length coded image portion 21, 22, 23, 28, 29 of the resulting encoded image 99.

The end of image marker inserter 106b is arranged to insert an EOI marker 40 as the terminating data of the last VLC-image 29. Thus, the image marker inserter 106b is arranged to terminate the fully encoded image 99 with the EOI marker 40 indicating the end of the image.

The writer 108 is arranged to write the from the encoder 104 outputted VLC-image 21, 22, 23, 28, 29 to the memory 110.

The memory 110 may be any kind of memory suitable for storing a digital image. For example may the memory 110 be a hard disk, a flash memory, a memory card, a memory stick, a DRAM, a SDRAM, a networked device, such as Bluetooth, or wireless driver etc.

Figure 6:
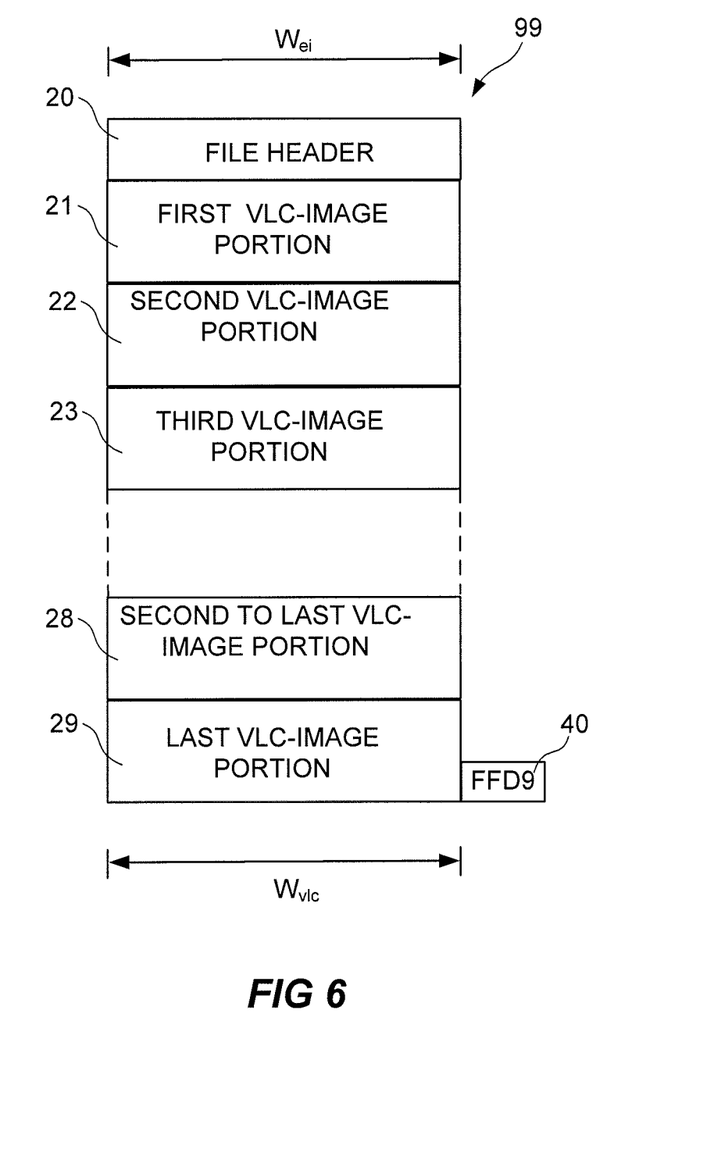
FIG. 6 is illustrating an image being encoded by the device shown in FIG. 5.

An example of an encoded image 99 encoded with the device according to this second embodiment of the invention is shown in FIG. 6. The encoded image 99 comprises a number of VLC-images 21, 22, 23, 28, 29. The final data sequence is ended by an EOI marker 40. Preferably, the encoded image 99 is encoded in accordance with the JPEG-standard.

According to an embodiment of the present invention each VLC-image 21, 22, 23, 28, 29 is having a specific width $W_{vic}$ corresponding substantially to a width $W_{ei}$ of the single encoded image 99. By encoding the VLC-image portions 21, 22, 23, 28, 29 with the same width as the width $W_{ei}$ of the single encoded image 99 the processing of each VLC-image as a single image is facilitated.

Further, each VLC-image 21, 22, 23, 28, 29 may have substantially the same height $H_{vic}$. Thus, the VLC-images 21, 22, 23, 28, 29 all have substantially the same amount of lines of pixels. An exception may be the last VLC-image 29 that may comprise fewer lines of pixels than the rest of the VLC-images 21, 22, 23, 28, 29.

According to an embodiment of the present invention the encoded image 99 is encoded in accordance with the JPEG-standard.

Let us assume that a digital representation of an image 1 is to be encoded into an encoded image 99 by a device for encoding a digital representation of an image 1 into a single encoded image 99 according to the second embodiment of the invention. According to an embodiment of the invention, a method for encoding the image 1 is then performed according to the following:

The digital representation of the image 1 is subsequently generated, by the image generator 100, into image data sequences representing portions 11, 12, 13, 18, 19 of the image 1. According to an embodiment the width $W_p$ of each of the portions 11, 12, 13, 18, 19 of the image 1 is corresponding substantially to the width $W_i$ of the image 1. Moreover, according to one embodiment all portions 11, 12, 13, 18, 19 of the digital representation of the image 1 are having the same height. Thus, every portion 11, 12, 13, 18, 19 of the digital representation of the image 1 are all having the same amount of lines of pixels, with possible exception to the last portion, see above. For example may an image originally consisting of 960×1280 ($W_i$×$H_i$) pixels be generated in ten portions 11, 12, 13, 18, 19 having a width $W_p$ of 960 pixels and a height $H_p$ of 128 pixels.

Each image data sequence representing a portion 11, 12, 13, 18, 19 of the digital representation of the image 1 is encoded by the encoder 104. In the encoder 104 each image data sequence representing a portion 11, 12, 13, 18, 19 of the digital representation of the image 1 is encoded into a VLC-image 21, 22, 23, 28, 29. According to an embodiment each VLC-image 21, 22, 23, 28, 29 is an image of JPEG format.

When the portion 11, 12, 13, 18, 19 of the digital representation of the image 1 has been encoded into a VLC-image 21, 22, 23, 28, 29 the encoder 104 is set in a restart state, step 406, in response to termination of the encoding of the VLC-image 11, 12, 13, 18, 19. In this manner the encoding of the input image 1 may be performed in portions with the encoder 104 being able to pause between encoding each portion 11, 12, 13, 18, 19 of the digital representation of the image 1 into VLC-image portion 21, 22, 23, 28, 29. This is especially useful when the step of generating a portion of the digital representation of the image 1 is slower than the step of encoding the recently generated portion 11, 12, 13, 18, 19 of the digital representation of the image 1 into a VLC-image portion 21, 22, 23, 28, 29. It is especially interesting when more than one portion are generated simultaneously.

When new image data to be encoded and belonging to the same image as the previously encoded image data is provided to the encoder 104 the encoder 104 is reactivated from the restart state initiated by the termination of a previously performed encoding of an image data sequence representing a previously encoded portion 11, 12, 13, 18, 19 of the digital representation of the image 1.

Each encoded VLC-image portion 21, 22, 23, 28, 29 is subsequently written to the memory 110. Thus, the encoded image 99 is subsequently encoded by means of the encoder 104.

Figure 7:
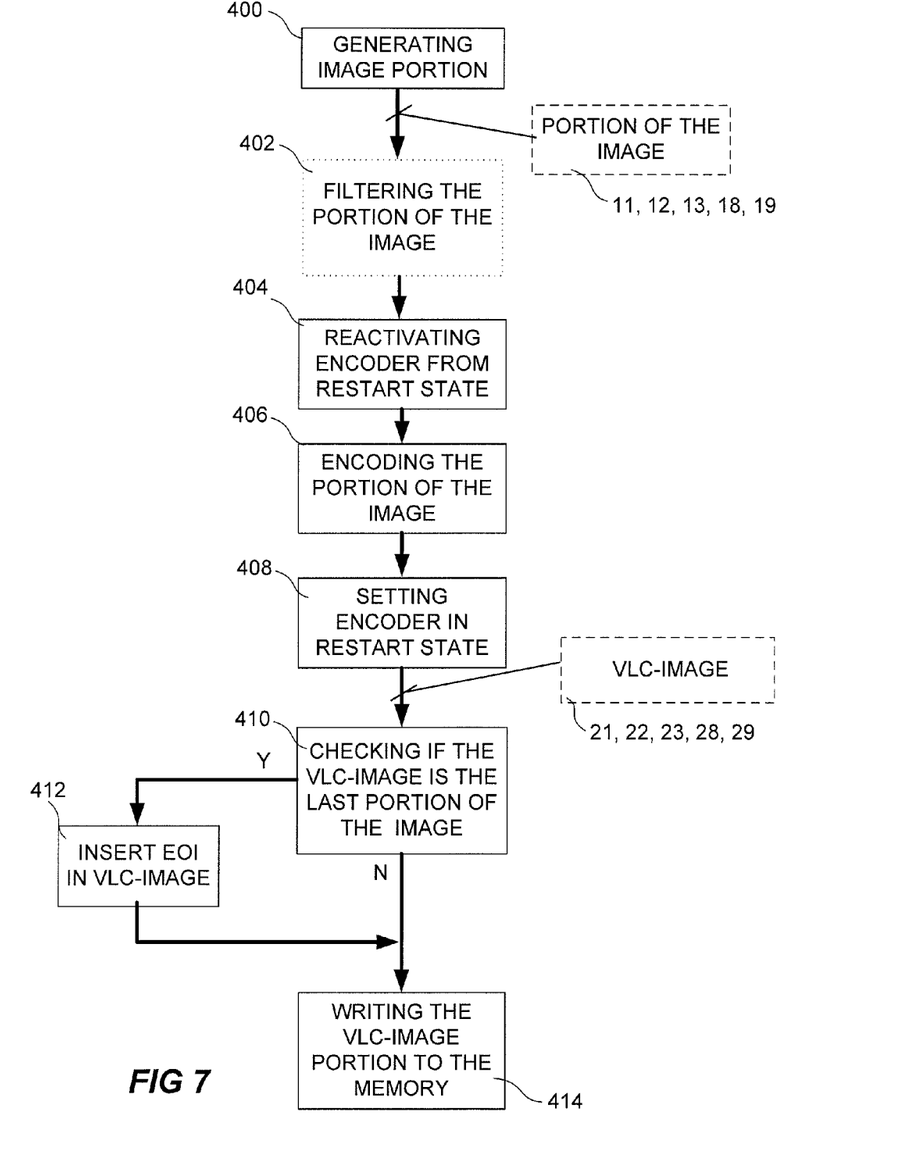
FIG. 7 is a flowchart of a method according to the second embodiment of the invention.

In FIG. 7 the processing of one image portion is depicted. An image portion of a digital representation of an image is generated, step 400. This image portion is already processed before step 400 or may be filtered in step 402, as discussed in connection with the first embodiment. Then when the image data of the image portion arrive at the encoder the encoder is reactivated from the restart state in order to continue processing image data belonging to the same image as the previously encoded image portion, step 404. Hence, the reactivation step is not performed for the first image portion of an image. Then the image portion received at the encoder is encoded, step 406, and when the encoding of the image portion is finished the encoder is set into the restart state, step 408, waiting for the next portion to arrive at the encoder. Then the image data has been encoded to a VLC-image 21,22,23,28,29. If the VLC-image is representing the last portion of the image to encode, step 410, then an end of image marker, EOI, is inserted in the VLC-image, step 412. Additionally, the restart state may be reset or not set at all when the last VLC-image is detected. Then, independent of whether the VLC-image is representing the last portion or not the VLC-image is written to memory, step 414. The processing of the associated VLC-images constituting the encoded image 99 and being stored in memory is similar to the corresponding processing described above in relation to the first embodiment.

The device for encoding a digital representation of an image 1 into a single encoded image 99 according to the present invention may be a mobile phone, a digital camera, a computer or the like. Further, the device for encoding a digital representation of an image 1 into a single encoded image 99 according to the present invention may comprise more than one processing means. According to one embodiment the processing means may be a CPU. According to yet another embodiment the processing means may be a CPU with multiple cores, e.g. dual cores, quadruple cores etc.

Figure 8:
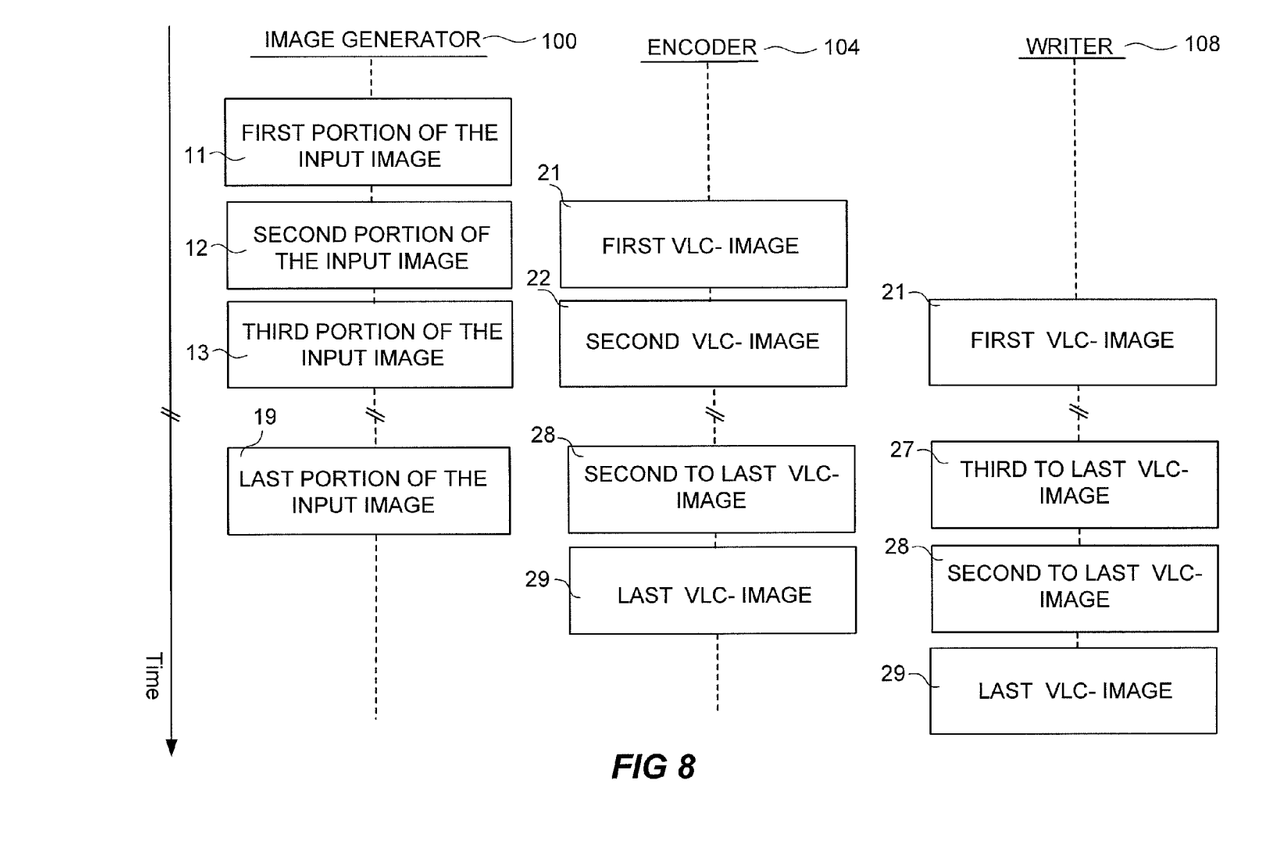
FIG. 8 is a schematic timing diagram showing that the writing to a memory of a first portion of the encoded image may be performed at the same time as the encoding of a second portion of the original image.

Independent of which of the above embodiments the embodiment of the device or process for encoding a digital representation of an image 1 into a single encoded image 99 according to the present invention that is implemented the step of writing a VLC-image 21, 22, 23, 28, 29 to the memory 110, the step of encoding an image data sequence representing a portion 11, 12, 13, 18, 19 of the digital representation of the image 1 into a VLC-image 21, 22, 23, 28, 29 and the step of generating an image data sequence representing a portion 11, 12, 13, 18, 19 of the digital representation of the image 1 may be performed simultaneously. This is depicted in FIG. 8, to which reference now is made. In FIG. 8 the time for generating the output from the process of generating an image data sequence representing a portion 11, 12, 13, 18, 19 of the digital representation of the image 1, the time for generating the output from the process of encoding each image data sequence representing a portion 11, 12, 13, 18, 19 of the digital representation of the image 1 into a VLC-image portion 21, 22, 23, 28, 29 and the time for writing each VLC-image portion 21, 22, 23, 28, 29 to the memory 110 are schematically shown.

In the left column of the timing diagram of FIG. 8 the time for generating each output from the image generator 100 generating an image data sequence representing a portion 11, 12, 13, 18, 19 of the digital representation of the image 1 is schematically shown. In the middle column of the timing diagram of FIG. 8 the time for generating the output from the encoder 104 is schematically shown. And in the right column of the timing diagram of FIG. 8 the time for the writer 108 to write the encoded data is schematically shown.

Looking at the top left of the timing diagram of FIG. 8 the generation of the first image data sequence representing the first portion 11 of the digital representation of the image 1 is shown. The first image data sequence representing the first portion 11 of the digital representation of the image 1 is represented by a data sequence. When the first image data sequence representing the first portion 11 of the digital representation of the image 1 has been generated the encoder 104 may encode the first image data sequence representing the first portion 11 of the digital representation of the image 1 into the first VLC-image 21. The first VLC-image 21 is represented by a data sequence. The schematic time for encoding by means of the encoder 104 is shown in the middle column of FIG. 8. When the first portion 11 of the digital representation of the image 1 is encoded into first VLC-image 21 the first VLC-image 21 may be written to the memory 110 by the writer 108. The time for writing by means of the writer 108 is shown in the right column of FIG. 8.

In the scenario depicted in FIG. 8 the first portion 11 of the digital representation of the image 1 is generated, encoded into a VLC-image 21 and written to the memory 110 and a second portion 12 of the digital representation of the image 1 may be generated, encoded into a second VLC-image 22 and written to the memory in the same manner. However, simultaneously with the first portion 11 of the digital representation of the image 1 being encoded into the first VLC-image 21 the second portion 12 of the digital representation of the image 1 may be generated. In the same manner simultaneously with the first encoded VLC-image portion 21 being written to the memory the second VLC-image portion 22 may be encoded. The writing, encoding and generating can be performed simultaneous because the image generator, the encoder 104 and the writer 108 are using different processing means and because the image being divided into portions. Thus, a portion 11, 12, 13, 18, 19 of the digital representation of the image 1 may be generated at the same time as encoding another portion of the image 1 into a VLC-image 21, 22, 23, 28, 29. Further, a portion 11, 12, 13, 18, 19 of the digital representation of the image 1 may be encoded into a VLC-image 21, 22, 23, 28, 29 at the same time as a previously encoded VLC-image 21, 22, 23, 28, 29 is written to the memory 110. Accordingly a portion 11, 12, 13, 18, 19 of the digital representation of the image 1 may be generated at the same time as a previously encoded VLC-image portion 21, 22, 23, 28, 29 is written to the memory 110.

According to another embodiment more than one data sequence of a portion 11, 12, 13, 18, 19 of the digital representation of the image 1 may be generated simultaneously. This is possible in an implementation including multiple processing means.

According to yet another embodiment of the present invention may more than one data sequence of a portion 11, 12, 13, 18, 19 of the digital representation of the image 1 be encoded into a VLC-image 21, 22, 23, 28, 29 simultaneously. Also this in an implementation including multiple processing means.

Thus, according to the present invention both time used and the amount of memory required may be reduced.

When encoding using VLC it is not possible to predict the final size of the output before encoding. Thus, large output buffers are generally required. However, according to the present invention memory requirement is reduced since an intermediate VLC-image buffers may be small due to the encoded image 99 being encoded in portions. E.g. if the encoded image is encoded in 10 portions the buffers may be approximately 10 times smaller. The reduction in memory requirement is even more explicit in view of not having to generate full image data for the whole image, but rather only having to generate the relevant image data for each portion 11, 12, 13, 18, 19 of the digital representation of the image 1.

Time is saved because of the possibility to simultaneously write a VLC-image portion 21, 22, 23, 28, 29 to the memory 110, encode an image data sequence representing a portion 11, 12, 13, 18, 19 of the digital representation of the image 1 into a VLC-image portion 21, 22, 23, 28, 29 and generate an image data sequence representing a portion 11, 12, 13, 18, 19 of the digital representation of the image 1.

Figure 9:
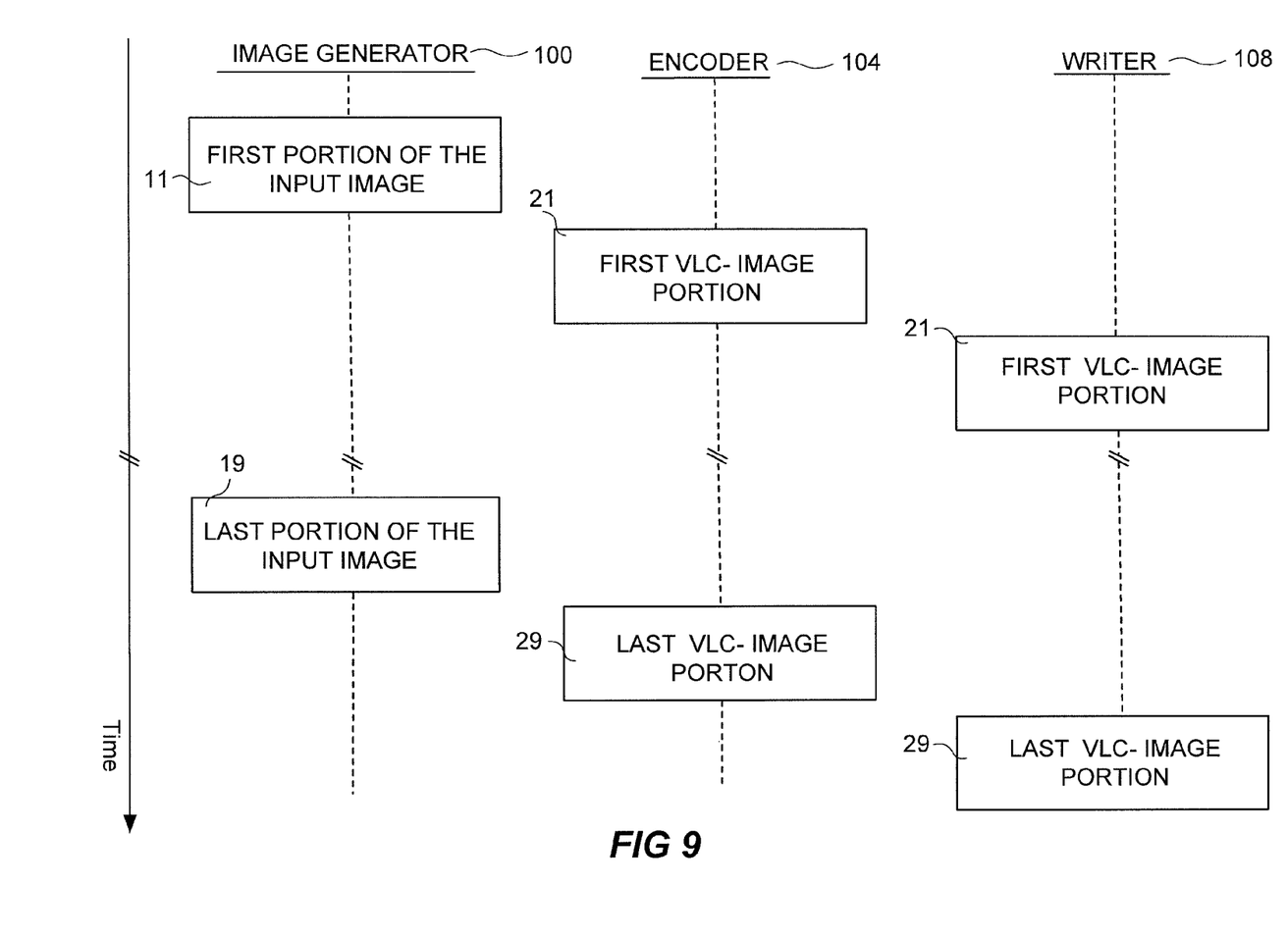
FIG. 9 is a schematic timing diagram showing the relation in time between processes on portions of an image according to one embodiment.

In FIG. 9 a timing diagram similar to the timing diagram of FIG. 8 is shown. The difference is that the processes of image generating, encoding, and writing of data to memory are not performing simultaneously. However, the processes are operating on portions of the full image 1 and the memory requirement may hence be reduced.

Image formats such as baseline JPEG contain blocks that are dependent on all previous blocks. By utilizing the similar properties of the EOI and the restart markers (originally used for error recovery in JPEG), we have created a method where parts of a large image can be generated, encoded, and written independently from each other, to form a final large encoded image.

The invention claimed is:

1. Method for encoding a digital representation of an image into a single encoded image, comprising:
generating at least two subsequent image data sequences each representing a portion of the digital representation of the image,
inputting to an encoder each of said subsequent image data sequences as if each image data sequence is an individual digital representations of an image,
encoding each subsequent image data sequence into a variable length coded image, thereby generating at least two variable length coded images each representing a portion of the single encoded image and each including an image file header,
inserting a restart marker as terminating data of at least one of the variable length coded images,
inserting an end of image marker as terminating data of one of the variable length coded images representing a final portion of the single encoded image,
associating the variable length coded images with each other by arranging them as subsequent parts of a single encoded data sequence representing the single encoded image, and
modifying at least one image file header of the at least two variable length coded images including identifying the at least one header as a single file header representing the associated variable length coded images forming the single encoded image.

2. Method according to claim 1, wherein the step of encoding each subsequent image data sequence representing a portion of the digital representation of the image into a variable length coded image further comprises inserting an end of image marker as terminating data in each of the encoded image data sequences, and wherein the step of inserting a restart marker as terminating data of the encoded image data sequences is performed by replacing the end of image marker with the restart marker.

3. Method according to claim 1, wherein the act of modifying at least one image file header includes:
determining a position of at least one restart marker in the single encoded image, and
inserting an indicator indicating the determined position of said at least one restart marker into a data structure of the image file header.

4. Method according to claim 1, wherein the step of inserting a restart marker as terminating data of at least one of the variable length coded image is performed by inserting the restart marker as last data of the encoded variable length coded image.

5. Method according to claim 1, wherein the step of inserting a restart marker as terminating data of at least one variable length coded image is performed by inserting the restart marker of the encoded variable length coded image as initial data of a subsequent variable length coded image.

6. Method according to claim 1, further comprising simultaneously writing data of a first variable length coded image to a memory and encoding an image data sequence representing a second portion of the digital representation of the image into a second variable length coded image.

7. Method according to claim 1, further comprising simultaneously generating the image data sequence representing a second portion of the digital representation of the image and encoding the image data sequence representing a first portion of the digital representation of the image into a first variable length coded image.

8. Method according to claim 1, wherein the digital representation of the image has a specific image width, and wherein each portion of the image has a specific portion width corresponding substantially to the image width.

9. Method according to claim 1, wherein each variable length coded image has a specific width, wherein the specific width corresponds to a width of the single encoded image.

10. Method according to claim 1, wherein each variable length coded image is an image of JPEG-format.

11. Method according to claim 10, wherein the act of inserting a restart marker comprises inserting a 0xFFDn code sequence wherein n indicates the 4 least significant bits of the code sequence and represents an integer between 0 and 7.

12. Method according to claim 10, wherein the act of inserting an end of image marker comprises inserting a 0xFFD9 code sequence.

13. Method according to claim 1, wherein the method is performed in a mobile telephone.

14. Method according to claim 1, wherein the method is performed in a digital camera.

15. Device for encoding a digital representation of an image into a single encoded image, comprising:
- an image generator arranged to generate subsequent image data sequences representing portions of the digital representation of the image,
- an encoder arranged to encode each image data sequence representing portions of the digital representation of the image into a variable length coded image including an image file header,
- a restart marker inserter arranged to insert a restart marker as terminating data of a variable length coded image,
- an end of image marker inserter arranged to insert an end of image marker as terminating data of a variable length coded image representing a final portion of the single encoded image, and
- an associating unit arranged to associate the variable length coded images with each other by arranging them as subsequent parts of a data sequence representing the single encoded image,
- wherein the encoder is further arranged to modify at least one image file header of the at least two variable length coded images including identifying the at least one header as a single file header representing the associated variable length coded images forming the single encoded image.

16. Device according to claim 15, wherein the image file header comprises at least one parameter indicating the position of restart markers in the single encoded image.

17. Device according to claim 15, further comprising a writer arranged to write the variable length coded images to a memory.

18. Device according to claim 15, wherein each subsequent image data sequences representing portions of the digital representation of the image has a specific portion width corresponding substantially to a image width of the digital representation of the image.

19. Device according to claim 18, wherein the end of image marker inserter is arranged to insert an end of image marker represented by a 0xFFD9 code sequence.

20. Device according to claim 15, wherein the encoder is arranged to encode each subsequent image data sequences representing portions of the digital representation of the image into a variable length coded image of JPEG-format.

21. Device according to claim 20, wherein the restart marker inserter is arranged to insert a restart marker represented by a 0xFFDn code sequence, wherein n indicates the 4 least significant bits of the code sequence and represents an integer between 0 and 7.

22. Device according to claim 15, wherein the device is a mobile phone.

23. Device according to claim 15, wherein the device is a digital camera.

* * * * *